No. 625,397. Patented May 23, 1899.
W. B. JACKSON.
PROCESS OF CHLORINATING ORES.
(Application filed Sept. 5, 1895.)

(No Model.)

UNITED STATES PATENT OFFICE.

WILLIAM B. JACKSON, OF PUEBLO, COLORADO.

PROCESS OF CHLORINATING ORES.

SPECIFICATION forming part of Letters Patent No. 625,397, dated May 23, 1899.

Application filed September 5, 1895. Serial No. 561,598. (No specimens.)

*To all whom it may concern:*

Be it known that I, WILLIAM B. JACKSON, a citizen of the United States of America, residing at Pueblo, Pueblo county, Colorado, have invented certain new and useful Improvements in Processes of Chlorinating Ores, of which the following is a specification.

This invention relates generally to the treatment of ores, and more particularly to a novel process for the chlorination of gold and silver bearing ores.

The present practice is to subject gold and silver bearing ores to different chlorinating treatments—gold ores to the wet or barrel method, which is attended by heavy expense and great loss in values, and silver ores to the roasting method, the chlorinating ingredients being mixed with the ore as it is fed into the furnace or while it is in the furnace; and as it has heretofore been considered impossible to chloridize gold ores in a furnace it has been necessary where the ore contains both gold and silver to subject it independently to both methods of treatment, each metal being removed separately, thus incurring heavy expense and making the treatment entirely too expensive for low-grade ores.

It is the object of these improvements, among other things, to provide a process and apparatus that are equally adapted to the chlorination of gold and silver ores and of ores containing both of said metals and by which the disadvantages and losses in values heretofore occurring are obviated and the treatment of low-grade ores rendered commercially feasible.

Having these objects in view, the invention consists in the novel features hereinafter set forth, reference being had to the accompanying drawings, illustrating so much of a furnace embodying the invention and in which the process may be practiced as is necessary to a proper understanding thereof.

Figure 1:
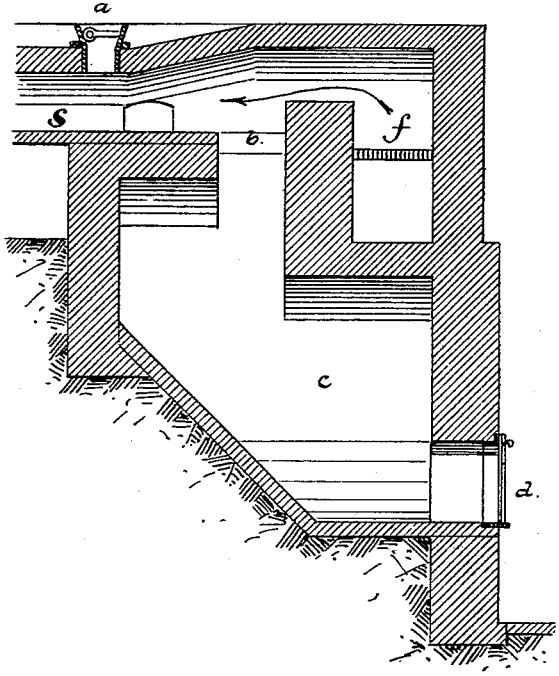
Figure 2:
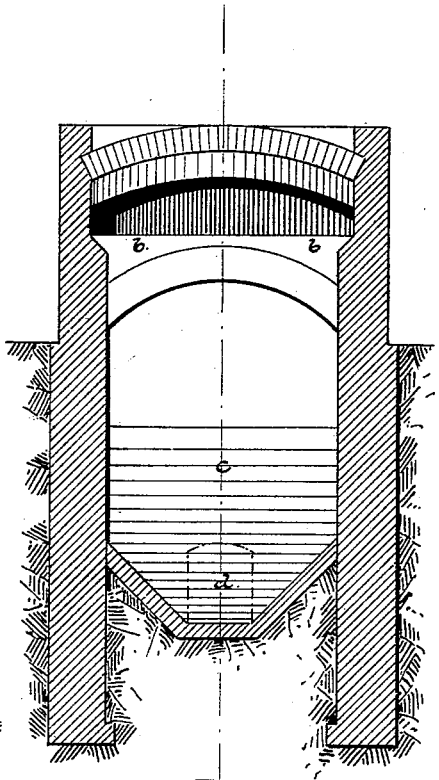

In said drawings, Figure 1 is a longitudinal sectional elevation, and Fig. 2 a cross-section on the line 2 2 of Fig. 1, of the furnace referred to.

The improved process consists in first roasting the ore under a low heat until the impurities and volatile substances have been driven off and the ore becomes "sweet," then when at its greatest heat—say a bright-red heat—adding and thoroughly mixing therewith a fluxing or chlorinating material composed of sulfid ore (preferably sulfid of iron) and salt in the proportions of twenty pounds of sulfid and eighty pounds of salt to one ton of ore, more or less, according to the amount of gold and silver contained in the ore to be treated. The chloridizing-fumes arising from the mixture are then allowed to collect in a chlorinating-chamber, originally displacing the atmospheric air therein, the air being drawn therefrom by its rarefaction and the heating of the chamber due to the draft of hot vapor from the furnace passing over the mouth of the chamber. The roasted ore, with the chlorinating material, is then allowed to gradually fall in a more or less thin stream into the chlorinating-chamber, where it comes into intimate contact with the chloridizing-fumes therein, which being unmixed with air will effectually perform their duty in chlorinating the gold and silver in the ore. The ore is allowed to remain in this chamber for several hours and may be drawn out from time to time and cooled in any proper manner, after which it is ready for any desired further treatment.

The chloridizing ingredients being fed into and mixed with the red-hot ore just before being discharged into the chloridizing-chamber, the sulfur ignites and gives off sulfurous-acid gas, which is converted into sulfuric-acid gas, instantly attacks the hot salt, liberating chlorin gas, which while in its nascent condition unites with the gold and silver and forms chlorid of gold and chlorid of silver.

In practicing the improved process the improved form of furnace illustrated in the drawings may be utilized and is especially useful. The furnace itself may obviously be of any desired form—that is to say, it may be a reverberatory, upright, horizontal, round, horseshoe, revolving, or other form or shape of sufficient capacity for the purpose.

The form of furnace shown is of the reverberatory type, having the usual fuel-chamber *f* and sole or hearth *s*. Between the fuel-chamber and the sole or immediately in advance of the fire-bridge there is provided an opening *b*, extending the width of the sole, leading to and forming the mouth of a chloridizing chamber or pit *c*, situated below the plane of the sole, so that the red-hot ore may fall or be caused to fall from the sole of the furnace through said mouth into the chloridizing-chamber. The latter chamber is provided with an air-tight door or slide $d$, through which the chlorinated ore may be drawn from time to time, and the roof of the furnace is provided with a feed-opening $a$, controlled in any proper manner for the admission of the fluxing or chlorinating material to the ore on the sole of the furnace. The heat and flame from the fuel-chamber of the furnace pass over the fire-bridge and mouth $b$ over the ore spread on the sole or hearth of the furnace in the direction of the arrow shown in Fig. 1, and in this manner and by reason of the heating of the air in the chloridizing-chamber $c$ the air therein is drawn upward therefrom and its place is taken by the heavier fumes of the fluxing or chlorinating material, which naturally seek the lowermost part of the furnace, with the result that said chamber $c$ becomes more or less entirely filled with such fumes to the exclusion of all atmospheric air.

The ore being roasted is from time to time, according to the means employed, either mechanical or by hand, allowed or caused to fall in a thin stream from the edge of the sole through the opening or mouth $b$ into the chloridizing-chamber $c$, all its particles being thereby brought into intimate contact with or caused to fall through heavily-laden chloridizing or fluxing fumes, whereby all its precious metals are subjected to the influence thereof and its gold and silver chlorinated.

The chloridizing-chamber may be of trough or hopper form with inclined sides, so that the ore may be collected at its bottom and be readily removed from the chamber through the door $d$ for further treatment.

The chloridizing-chamber may be of any dimensions desired and may be for convenience placed immediately beneath the roasting-furnace and should have a capacity for holding as much ore as possible, so that the ore may be permitted to remain therein for several hours.

The opening or mouth in the hearth or floor of the furnace being two to three feet wide and extending across the entire width of the furnace and over which a continuous flame is passing, all the free air is drawn out of the chloridizing-chamber, so that the red-hot ore falls into a chamber devoid of air, and as chlorin-gas is nearly two and one-half times heavier than air it remains in the hot ore, so that the chlorination may be carried on for an indefinite period and there can be no loss of chlorin or values.

What is claimed is—

The herein-described process of chlorinating ores, which consists in roasting the ore under a low heat, adding to the heated ore a chlorinating material consisting of a sulfid ore and salt, continuing the heat at a bright red, allowing the chlorinating-fumes to attack the ore, and thereafter allowing the mixture to cool while in the chloridizing-fumes.

In witness whereof I have hereunto set my hand in the presence of two witnesses.

WILLIAM B. JACKSON.

Witnesses:
SUSIE N. HEROLD,
JOHN F. DRESCHER.